United States Patent
Payne et al.

(10) Patent No.: US 7,310,180 B2
(45) Date of Patent: Dec. 18, 2007

(54) DIELECTRIC SPACER FOR ENHANCED SQUEEZE-FILM DAMPING OF MOVABLE MEMBERS OF MEMS DEVICES

(75) Inventors: Alexander P. Payne, Ben Lomond, CA (US); Omar S. Leung, Palo Alto, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 0 days.

(21) Appl. No.: 11/264,959

(22) Filed: Nov. 1, 2005

(65) Prior Publication Data

US 2006/0098266 A1 May 11, 2006

Related U.S. Application Data

(60) Provisional application No. 60/625,499, filed on Nov. 5, 2004.

(51) Int. Cl.
*G02B 26/00* (2006.01)
(52) U.S. Cl. .................. 359/291; 359/231; 359/556
(58) Field of Classification Search ............... 359/290, 359/245, 247, 248, 302, 337, 346, 370, 398, 359/498, 556, 577; 372/20, 25, 26, 32; 385/14, 385/16, 24
See application file for complete search history.

(56) References Cited

U.S. PATENT DOCUMENTS 6,750,998 B2 * 6/2004 Kruschwitz et al. ........ 359/230
7,046,420 B1 * 5/2006 Hunter et al. ............... 359/291

OTHER PUBLICATIONS

Corrigan, Robert, et al, "Silicon Light Machines—Grating Light Valve Technology Brief", Jun. 2001, pp. 1-8; Silicon Light Machines, Sunnyvale, California.
Amm, D.T., et al. "Grating Light Valve Technology: Update and Novel Applications" May 19, 1998, pp. 1-4; Presented at Society for Information Display Symposium, Anaheim, California.
Amm, David T., et al. "Optical Performance of the Grating Light Valve Technology" 1999, pp. 1-8; Silicon Light Machines, Sunnyvale, California.
Corrigan, R.W., et al. "An Alternative Architecture for High Performance Display" Nov. 20, 1999, pp. 1-5; Presented at the 141st SMPTE Technical Conference and Exhibition, New York, NY.
Bloom, D.M., et al. "The Grating Light Valve: revolutionizing display technology" 1997, pp. 1-10; Silicon Light Machines, Sunnyvale, California.
Corrigan, R.W., et al. "Calibration of a Scanned Linear Grating Light ValveTM Projection System", May 18, 1999, pp. 1-4; Presented at Society for Information Display Symposium, San Jose, California.

* cited by examiner

*Primary Examiner*—Scott J. Sugarman
*Assistant Examiner*—Tuyen Tra
(74) *Attorney, Agent, or Firm*—Okamoto & Benedicto LLP

(57) ABSTRACT

In one embodiment, a capacitive micro electro-mechanical systems (MEMS) device includes a dielectric spacer between a bottom electrode and a movable member. The movable member may serve as a top electrode. A gap separates the top electrode from the dielectric spacer. The movable member may be actuated to deflect towards the bottom electrode by electrostatic force. The dielectric spacer reduces the height of the gap that would otherwise be formed between a top surface of the bottom electrode and a bottom surface of the movable member, thereby improving squeeze-film damping. The movable member may be a ribbon of a ribbon-type diffractive spatial light modulator, for example.

9 Claims, 9 Drawing Sheets

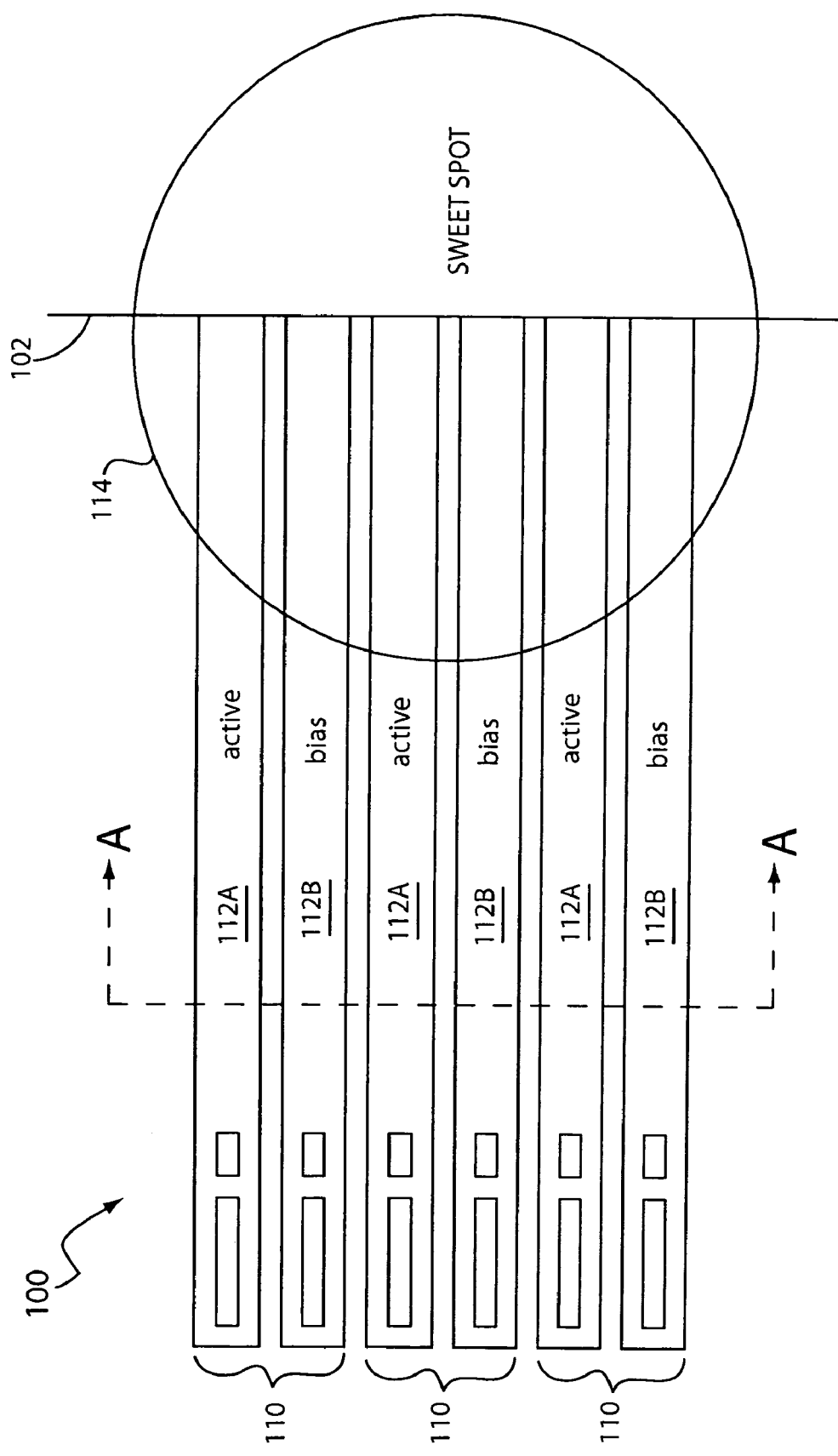

DIELECTRIC SPACER FOR ENHANCED SQUEEZE-FILM DAMPING OF MOVABLE MEMBERS OF MEMS DEVICES

CROSS-REFERENCE TO RELATED APPLICATION

This application claims the benefit of U.S. Provisional Application No. 60/625,499, filed on Nov. 5, 2004, which is incorporated herein by reference in its entirety.

BACKGROUND OF THE INVENTION

1. Field of the Invention

The present invention relates generally to micro electro-mechanical systems (MEMS), and more particularly but not exclusively to MEMS light modulators.

2. Description of the Background Art

MEMS devices typically include micro mechanical structures that may be actuated using electrical signals. MEMS devices may be employed in various applications including light modulation for printing, video display, optical networks, and maskless lithography. Example MEMS light modulators include the Grating Light Valve™ (GLV™) light modulators available from Silicon Light Machines, Inc. of Sunnyvale, Calif. (Grating Light Valve™ and GLV™ are trademarks of Silicon Light Machines, Inc.). A light modulator may employ movable ribbon-like structures. Such a light modulator is also referred to as a "ribbon-type diffractive spatial light modulator." A ribbon may be deflected to modulate light incident thereon.

FIG. 1A schematically shows a top view of a portion of a conventional ribbon-type diffractive spatial light modulator 100. Light modulator 100 includes ribbon pairs 110, with each ribbon pair 110 consisting of a deflectable active ribbon 112A and a stationary bias ribbon 112B. In some applications, 3 ribbon pairs 110 are employed to represent one pixel of information (e.g. a pixel of a video image). The ribbons 112 (i.e. 112A and 112B) are symmetrical about a symmetry line 102. The right hand portion of the ribbons 112 are not shown for clarity of illustration. In operation, a light source illuminates the optically active area 114 of the ribbons 112. The optically active area is also referred to as a "sweet spot" as it is the portion of the ribbons 112 configured to be illuminated by a light source. In the example of FIG. 1A, active ribbons 112A are configured to deflect, while bias ribbons 112B are configured to remain relatively stationary or fixed. Light modulator 100 represents a particular implementation where the ribbons are used as modulator elements, as opposed to embodiments wherein the ribbons and the gaps between the ribbons are used as the modulating elements.

FIG. 1B schematically shows a side cross-sectional view of the light modulator 100 taken at section A-A of FIG. 1A. Each ribbon 112 (i.e. 112A or 112B) comprises a reflective material 120 supported by a resilient structure 121. A gap separates the ribbons 112 from the substrate 122. The gap is filled with gas (e.g. He, N2, H2) before the light modulator 100 is hermetically sealed during packaging. The packaging may include an optically transparent lid to allow light to shine to the ribbons 112. On top of the substrate is a drive electrode 131, also referred to as a "bottom electrode." The reflective materials 120 may be configured as actuator electrodes, also referred to as "top electrodes." Applying a potential difference between the drive electrode 131 and the actuator electrodes creates an electrostatic force that deflects the actuator electrodes toward the substrate 122.

FIG. 1C schematically shows the ribbons 112 of FIG. 1B when the active ribbons 112A are actuated. As shown in FIG. 1C, a height difference between adjacent ribbons can be changed by controllably deflecting the active ribbons 112A towards the substrate 122 by up to about $9\lambda/4$ and more typically about $5\lambda/4$, where $\lambda$ is the wavelength of the incident light. If, upon reflection, the light from adjacent ribbons is in phase, then the $0^{th}$ order light reflection is effectively maximized and the light modulator 100 is in an ON state. To minimize the $0^{th}$ order light reflection, the active ribbons 112A are deflected by an odd multiple of the wavelength. When the $0^{th}$ order light reflection is minimized, the light modulator 100 is in an OFF state. The ribbons 112A may be actuated such that the light modulator 100 is ON, OFF, or in between to modulate incident light.

The speed of currently available devices employing ribbon-type diffractive spatial light modulators is limited by damping time "$\tau$" (tau), which is the time required for a ribbon to transition from an OFF state to an ON state, or from a first deflected state to an undeflected or a second deflected state. It is generally desirable to minimize damping time to increase the speed of movable MEMS structures.

SUMMARY

In one embodiment, a capacitive micro electro-mechanical systems (MEMS) device includes a dielectric spacer between a bottom electrode and a movable member. The movable member may serve as a top electrode. A gap separates the top electrode from the dielectric spacer. The movable member may be actuated to deflect towards the bottom electrode by electrostatic force. The dielectric spacer reduces the height of the gap that would otherwise be formed between a top surface of the bottom electrode and a bottom surface of the movable member, thereby improving squeeze-film damping. The movable member may be a ribbon of a ribbon-type diffractive spatial light modulator, for example.

These and other features of the present invention will be readily apparent to persons of ordinary skill in the art upon reading the entirety of this disclosure, which includes the accompanying drawings and claims.

DESCRIPTION OF THE DRAWINGS

FIGS. 1A, 1B, and 1C schematically show a conventional ribbon-type diffractive spatial light modulator.

The use of the same reference label in different drawings indicates the same or like components. Drawings are not necessarily to scale.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
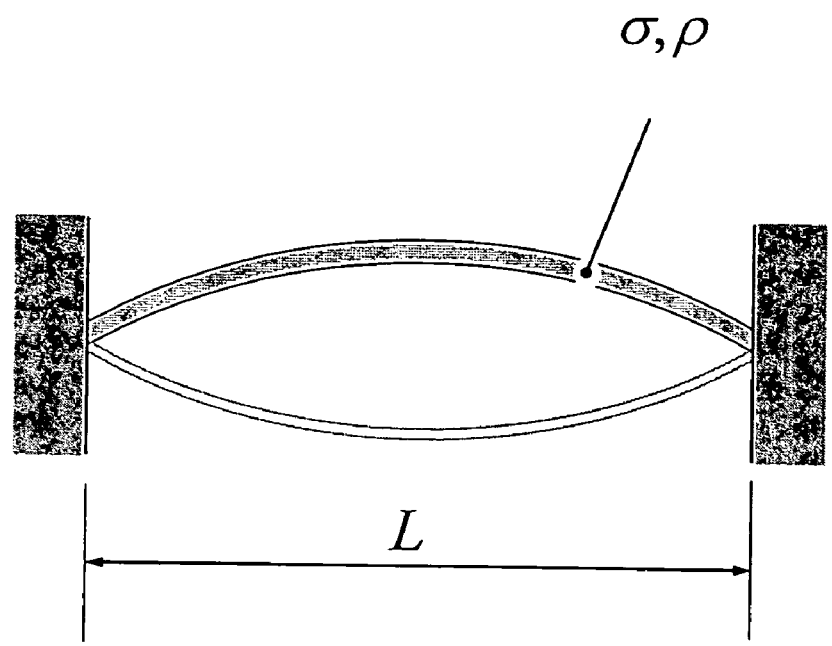
FIG. 2 schematically illustrates the resonant frequency of a vibrating string in relation to various physical characteristics of the string.

FIG. 2 schematically illustrates the resonant frequency of a vibrating string in relation to various physical characteristics of the string. A deflecting active ribbon behaves similarly to a vibrating string. The resonant frequency $v_0$ is related to the characteristics of the string by the following equation:

$$v_0 = \frac{1}{2L}\sqrt{\frac{\sigma}{\rho}} \qquad \text{(Eq. 1)}$$

In the case of a ribbon, L is ribbon length, $\sigma$ is ribbon stress, and $\rho$ is ribbon density.

Figure 1B:
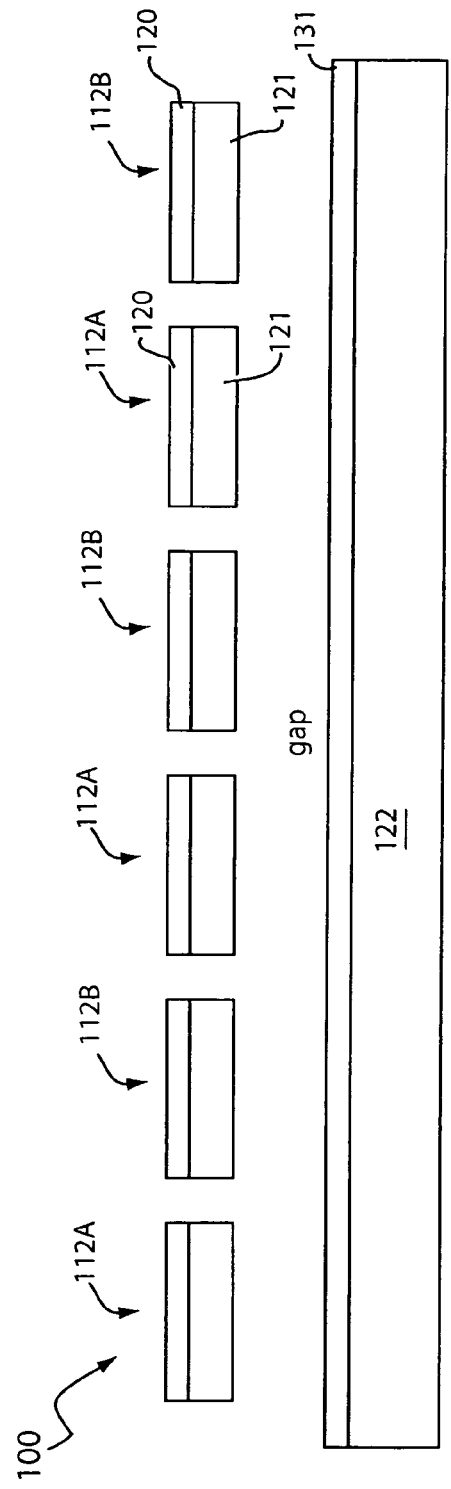
Figure 1C:
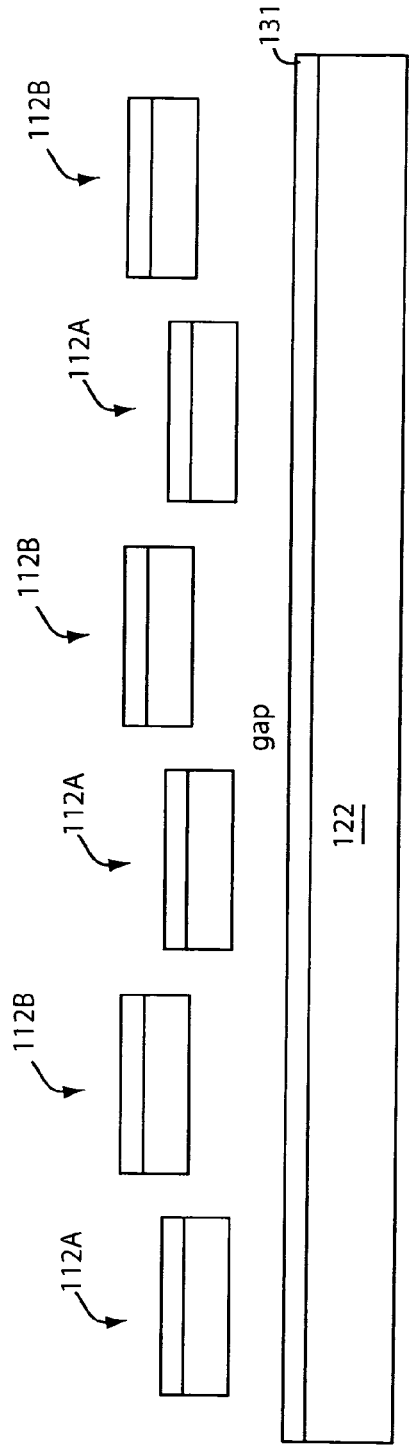

After switching, it is desirable that all subsequent motion of a movable MEMS structure is quickly damped away. Often, it is the damping time that limits the switching speed of the device and determines what applications it is suitable for. The damping time is the time required for parasitic oscillations to decay by 1/e of their initial value. Capacitively driven MEMS devices, such as light modulator 100 of FIG. 1, are commonly damped by gas occupying the space between the plates comprising the capacitor. If the gap thickness G separating a lower surface of the ribbon from an upper surface of an opposing solid plane (e.g. top surface of a bottom electrode) is small relative to other dimensions of the device, the gas is essentially trapped between the two surfaces and acts as a shock absorber. This is referred to as "squeeze-film" damping. This mode of damping is a strong function of the gap thickness (cubic dependence, $\tau \sim 1/G^3$).

Figure 3:
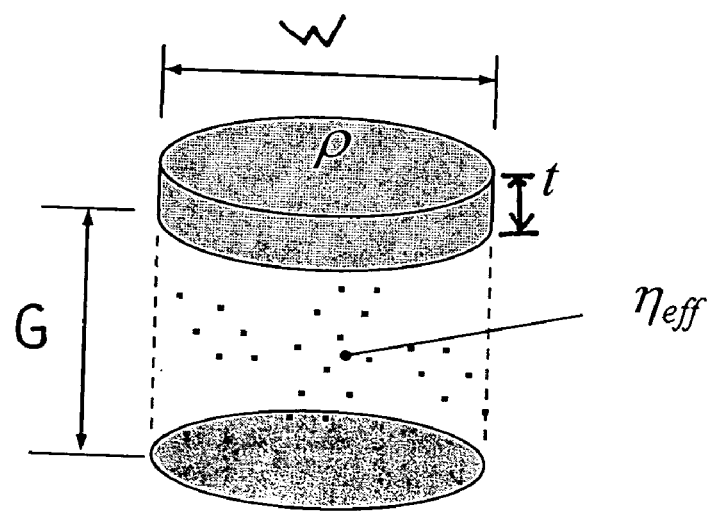
FIG. 3 schematically illustrates the impact of various characteristics of a ribbon-type diffractive spatial light modulator on damping time.

FIG. 3 schematically illustrates the impact of various characteristics of a ribbon-type diffractive spatial light modulator on damping time ($\tau$). These characteristics include: gap thickness (G) that is the distance separating a lower surface of the ribbon from an upper surface of an opposing solid plane (e.g. top surface of a bottom electrode); ribbon density ($\rho$); ribbon thickness (t); ribbon width (w); and the gas effective viscosity ($\eta_{eff}$) of gas enveloping the light modulator and filling spaces between the ribbons and the opposing solid plane. The damping time ($\tau$), is related to these characteristics by the following equation:

$$\tau = \frac{\pi^3 \rho t G^3}{48 \eta_{eff} w^2} \qquad \text{(Eq. 2)}$$

Note the dependence of the damping time ($\tau$) on the cube of the gap thickness (G). It should also be noted that although many if not all of these ribbon characteristics can be optimized for speed (i.e. minimized damping time) there is typically a compromise of other device performance parameters including wavelength of modulated light, illumination efficiency or fill-factor, diffraction angle, die or modulator size, sweet spot size, snap-down margin, or operating voltages.

Figure 4:
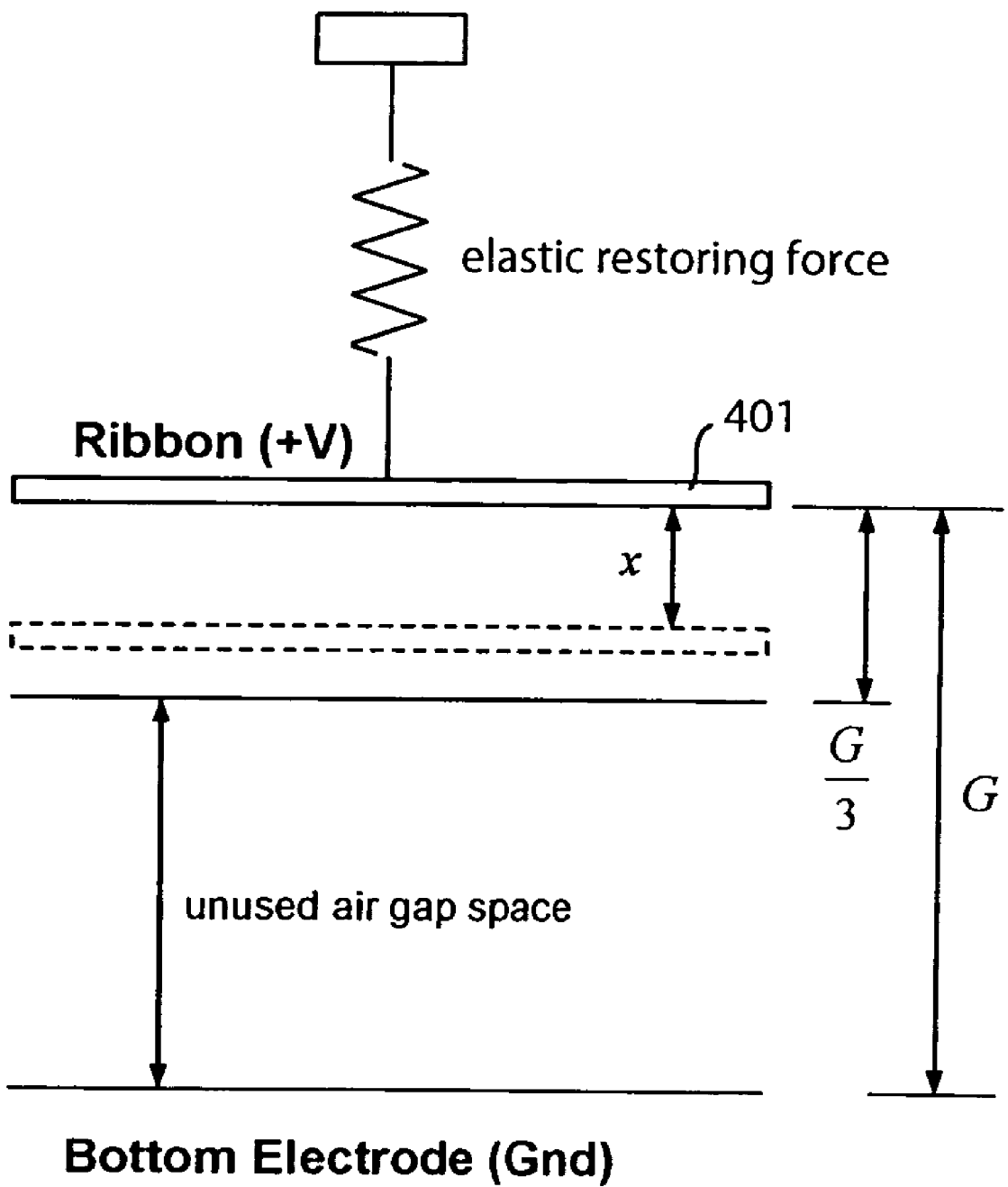
FIG. 4 shows a model of a conventional ribbon-type diffractive spatial light modulator.

One particularly important phenomenon relating to capacitively actuated MEMS devices is the so-called "snap-down" (also referred to as "pull-in"). FIG. 4 shows a model of a conventional ribbon-type diffractive spatial light modulator. In the example of FIG. 4, a voltage potential applied between a ribbon 401 and the bottom electrode creates an electrostatic force that deflects the ribbon 401 a distance x towards the bottom electrode. The electrostatic force is balanced by an elastic restoring force (represented by a spring in FIG. 4). The elastic restoring force, which is due to the structural configuration of the ribbon 401, allows the ribbon 401 to revert back to its neutral state or position once the electrostatic force is removed. As the ribbon 401 displaces past ⅓ the total thickness of the gap (G), the electrostatic force overwhelms the elastic restoring force. This results in the ribbon 401 snapping into contact with the bottom electrode and sticking there even if the electrostatic force is removed. It should be noted that snap-down occurs at a characteristic displacement of x=G/3, where the ribbon 401 has been deflected by one third of the original gap thickness. Thus, capacitive MEMS devices are typically not deflected by a distance more than G/3. Accordingly, in conventional ribbon-type diffractive light modulators, the lower ⅔ of the gap G is typically left empty to prevent snap-down, but unfortunately leads to poor squeeze-film damping.

The capacitive response C(x) of the light modulator of FIG. 4 is given by the equation:

$$C(x) = \frac{\varepsilon_0 A}{G - x} \qquad \text{(Eq. 3)}$$

where $\varepsilon_0$ is the permittivity of free space (8.85e-12 $C^2/N\text{-}m^2$), A is the effective capacitive area of the ribbon in $m^2$, G is gap thickness, and x is the linear displacement of the ribbon, in meters, relative to the bottom electrode. As will be more apparent below, light modulators according to embodiments of the present invention allow for the same capacitive response as the light modulator of FIG. 4, but with improved damping time.

In embodiments of the present invention, a capacitively driven MEMS device includes a dielectric material inserted between a movable member of the device and a bottom electrode, filling an area that would otherwise be filled with gas volume. The dielectric material forms a spacer that reduces the distance between the movable member and the bottom electrode, thereby improving squeeze-film damping of the device without significantly changing its mechanical or electrical properties. Embodiments of the present invention are particularly suited to ribbon-type diffractive spatial light modulators, but may also be employed in other capacitive MEMS devices.

Figure 5A:
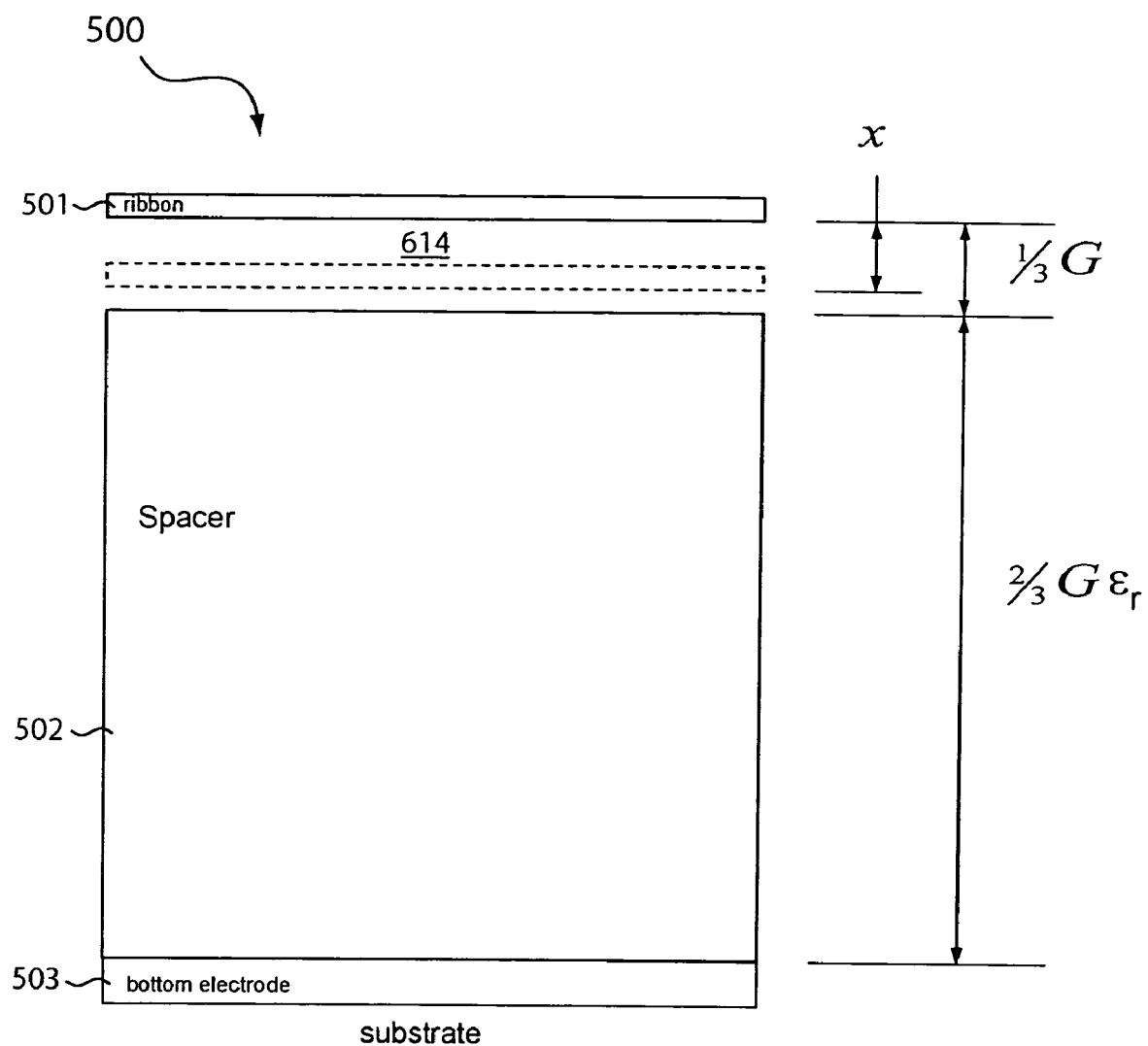
FIG. 5A schematically shows a cross-sectional view of a portion of a ribbon-type diffractive spatial light modulator in accordance with an embodiment of the present invention.
Figure 5B:
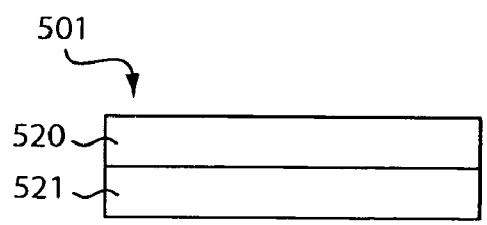
FIG. 5B schematically shows a cross-sectional view of a ribbon in accordance with an embodiment of the present invention.

FIG. 5A schematically shows a cross-sectional view of a portion of a ribbon-type diffractive spatial light modulator 500 in accordance with an embodiment of the present invention. The light modulator 500 may comprise a ribbon 501, a dielectric spacer 502, and a bottom electrode 503 formed over a substrate (e.g. silicon substrate). As shown in FIG. 5B, a ribbon 501 may comprise a reflective material 520 (e.g. aluminum) formed over a resilient material 521 (e.g. silicon nitride). Reflective material 520 and resilient material 521 function in the same manner as their counterparts in the device of FIGS. 1A-1C. That is, the reflective material 520 reflects incident light, while resilient material 521 provides a resilient structure that supports the reflective material 520.

Light modulator 500 of FIG. 5A is a capacitive MEMS device in that it comprises microstructures that may be driven by applying an electrostatic force. In the example of FIG. 5A, the capacitor is formed by the reflective material of the ribbon 501 (see 520 in FIG. 5B) serving as a top plate, the bottom electrode 503 serving as a bottom plate, and the dielectric spacer 502 and gap 614 serving as the dielectric between the top and bottom plates. Applying a voltage potential between the ribbon 501 and the bottom electrode 503 generates an electrostatic force that deflects the ribbon 501 a distance x towards the bottom electrode 503. In the example of FIG. 5A, to prevent snap down, the ribbon 501 is driven less than ⅓ the distance G, which is the distance between the top surface of the bottom electrode 503 and the bottom surface of the ribbon 501.

In the example of FIG. 5A, the dielectric spacer 502 occupies a space that would otherwise be occupied by the gas in gap 614. In one embodiment, the dielectric spacer 502 comprises a dielectric material, such as silicon dioxide. Preferably, the thickness of the dielectric spacer 502 is adjusted to electrically act as 2G/3 in thickness. In any event, the thickness of the dielectric spacer 502 may be greater than at least half the distance between a bottom surface of the ribbon 501 and the top surface of the bottom electrode 503.

It is to be noted that the actual thickness of the dielectric spacer 502 may vary depending on the application and may be optimized by experimentation. In the example of FIG. 5A, the thickness of the dielectric spacer 502 has been scaled by the relative dielectric constant ($\epsilon_r$) of the spacer material. In one example where the incident light has a wavelength of about 800 nm, the spacer material comprises silicon dioxide ($\epsilon_r$=3.8), and the original gap distance G is 1 μm, the dielectric spacer 502 comprises about 2.5 μm thick silicon dioxide and a gap of 266 μm. While substantial, this thickness of oxide may be readily formed using conventional semiconductor processing technology.

The capacitive response C(x) of light modulator 500 is given by the following equation:

$$C(x) = \left[\left(\frac{\epsilon_0 A}{\frac{G}{3}-x}\right)^{-1} + \left(\frac{\epsilon_0 \epsilon_r A}{\frac{2G}{3}\epsilon_r}\right)^{-1}\right]^{-1} = \frac{\epsilon_0 A}{G-x} \quad \text{(Eq. 4)}$$

where $\epsilon_0$ is the permittivity of free space, A is the effective capacitive area of the ribbon in m², G is gap thickness, $\epsilon_r$ is the relative dielectric constant of the spacer material, and x is the linear displacement, in meters, of the ribbon relative to the bottom electrode. It is to be noted that the expression for total capacitance as a function of displacement for light modulator 500 is identical to the light modulator of FIG. 4 (compare Eq. 3 to Eq. 4). That is, the dielectric spacer 502 allows light modulator 500 to behave identically to a conventional light modulator, both structurally and electrically, albeit with improved damping time. Because the capacitive response C(x) is identical, the quarter wavelength voltage ($V_{\lambda/4}$), snap-down voltage ($V_{snap}$) and snap-down displacement ($x_{snap}$), of the two devices are also identical. This means that light modulator 500, with its improved damping time, may be employed in applications where conventional ribbon-type diffractive spatial light modulators are employed.

A significant advantage of light modulator 500 over conventional devices is the approximately 27× reduction in damping time τ resulting from the 3× reduction in gap thickness G. As an additional benefit, the light modulator 500 helps prevent catastrophic snap-downs. The presence of a dielectric spacer means the electrostatic force will most often be less than (or at most equal to) the elastic restoring force so snap-down is prevented from occurring. The effect of bringing the ribbon into contact with the dielectric spacer may be detrimental regardless of the balance between electrostatic and elastic forces, so it is still preferable that the ribbon is not driven past a distance G/3.

Figure 6A:
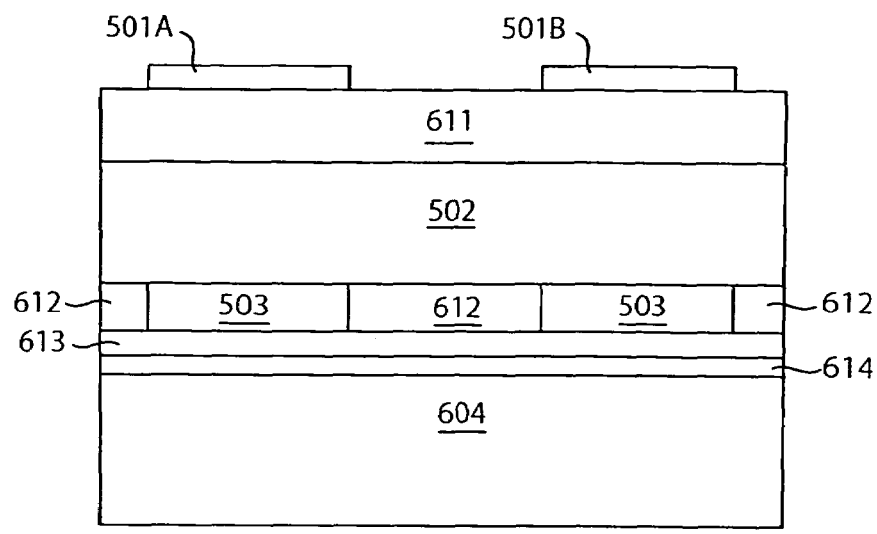
FIGS. 6A and 6B schematically illustrate the fabrication of a ribbon-type diffractive spatial light modulator in accordance with an embodiment of the present invention.

A method 700 of fabricating a MEMS device in accordance with an embodiment of the present invention is now described with reference to the schematic diagrams of FIGS. 6A and 6B and the flow diagram of FIG. 7. The fabrication steps of method 700 are provided herein merely for illustration purposes, not as a limitation. As can be appreciated, a light modulator in accordance with an embodiment of the present invention may also be fabricated using other fabrication process without detracting from the merits of the present invention. Method 700 omits well known steps, such as masking and planarization steps, in the interest of clarity.

In step 702, an oxide layer 614 is formed over a substrate 604. Substrate 604 may be a silicon substrate. Oxide layer 614 may be formed by growing oxide to a thickness of about 1 micron on substrate 604, for example.

In step 704, an isolation layer 613 is formed over the oxide layer 614. In one embodiment, the isolation layer comprises silicon nitride formed to a thickness of about 1000 Angstroms, for example.

In step 706, bottom electrodes 503 are formed over the isolation layer 613. The bottom electrodes 503 may comprise a metal or doped polysilicon. In one embodiment, the bottom electrodes 503 comprise doped polysilicon formed to a thickness of about 3000 to 10000 Angstroms, for example. Isolation layers 612 are formed between and to the same thickness as bottom electrodes 503.

In step 708, the dielectric spacer 502 is formed over the bottom electrodes 503. In one embodiment where the incident light has a wavelength of 800 nm, the dielectric spacer 502 comprises silicon dioxide ($\epsilon_r$=3.8), and the distance between the bottom surface of the subsequently formed ribbons 501 (i.e. 501A, 501B) and the top surface of the bottom electrodes 503 is 0.3 μm, the dielectric spacer 502 is about 2.8 μm thick, for example.

In step 710, a sacrificial layer 611 is formed over the dielectric spacer 502. The sacrificial layer 611 may be formed to a thickness that will fill the remaining space between the dielectric spacer 502 and the subsequently formed ribbons 501. Sacrificial layer 611 may comprise a material that is preferentially etched by a noble gas fluoride (e.g. xenon difluoride). In one embodiment, the sacrificial layer 611 comprises amorphous silicon.

In step 712, ribbons 501 are formed over the sacrificial layer 611. As shown in FIG. 5B, a ribbon 501 may comprise a reflective material 520 supported by a resilient material 521. In one embodiment, the resilient material 521 comprises silicon nitride formed to a thickness of about 500 to 2000 Angstroms, while the reflective material 520 comprises aluminum formed to a thickness of about 500 to 1000 Angstroms, for example. In forming the ribbons 501, the resilient material 521 may be deposited over the sacrificial layer 611. The reflective material 520 is then deposited over the resilient material 521. The reflective material 520 and the resilient material 521 are patterned to form the ribbons 501.

Figure 6B:
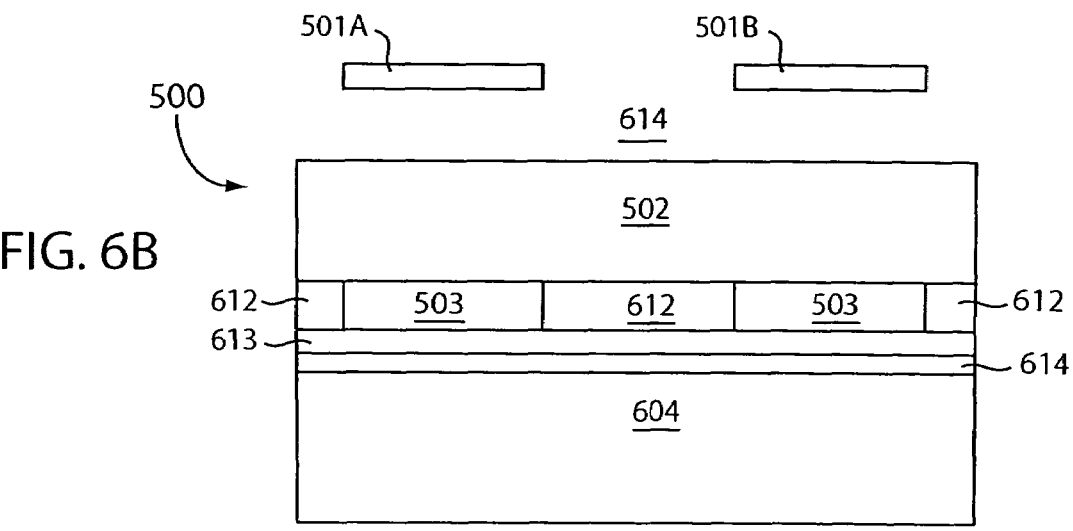
Figure 7:
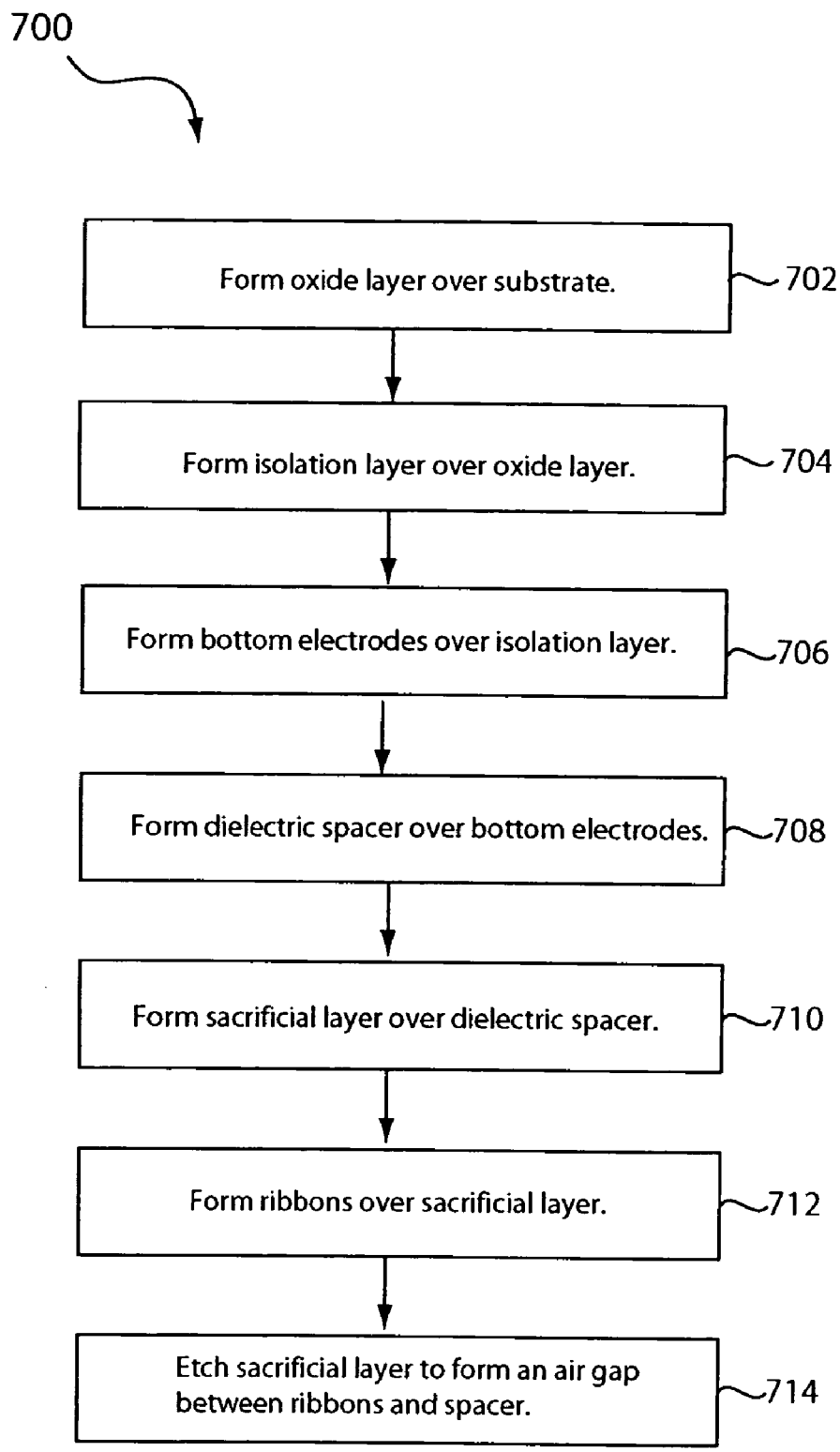
FIG. 7 shows a flow diagram of a method of fabricating a MEMS device in accordance with an embodiment of the present invention.

In step 714, with reference to FIG. 6B, the sacrificial layer 611 is etched to form the gap 614 between the ribbons 501 and the dielectric spacer 602. In one embodiment, a sacrificial layer 611 comprising amorphous silicon is etched using an etchant comprising a noble gas fluoride, such as xenon difluoride. Etching the entirety of sacrificial layer 611 forms gap 614 and releases the ribbons 501. The light modulator 500 may be packaged using conventional packaging techniques.

Figure 6C:
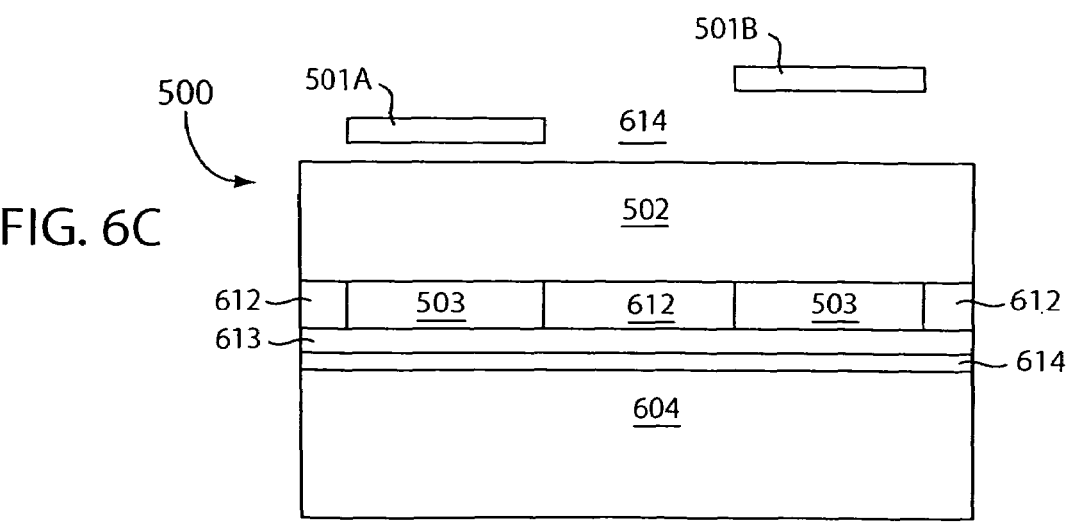
FIG. 6C schematically shows the actuation of a ribbon of the light modulator of FIG. 6B.

In the example of FIG. 6 (i.e. FIGS. 6A, 6B, and 6C), a ribbon 501A serves as a movable member of the light modulator 500 and a ribbon 501B serves as a stationary member. That is, the ribbon 501A serves as a deflectable active ribbon and the ribbon 501B serves as a stationary bias ribbon. Each ribbon 501 has an associated bottom electrode 503 directly underneath. In one embodiment, all bottom electrodes 503 are tied together to ground. A positive voltage is applied to a ribbon 501A to deflect it toward its associated bottom electrode 503, as shown in FIG. 6C, by electrostatic force. Means for deflecting the ribbon 501A may comprise drive electronics (not shown) coupled to the ribbon 501A and bottom electrodes 503. No voltage is applied to a ribbon 501B to keep it stationary. The general principle of operation of light modulator 500 is similar to conventional ribbon-type diffractive spatial light modulators, except with improved damping time.

Another advantage of using a dielectric spacer in the otherwise gap space is that the dielectric spacer may be formed as a stack of dielectric materials and configured as a multilayer dielectric mirror. This way, the dielectric stack would serve not only as a means of enhancing squeeze-film damping but also as a means of enhancing substrate reflectivity. This embodiment is now described with reference to FIGS. 8A and 8B.

Figure 8A:
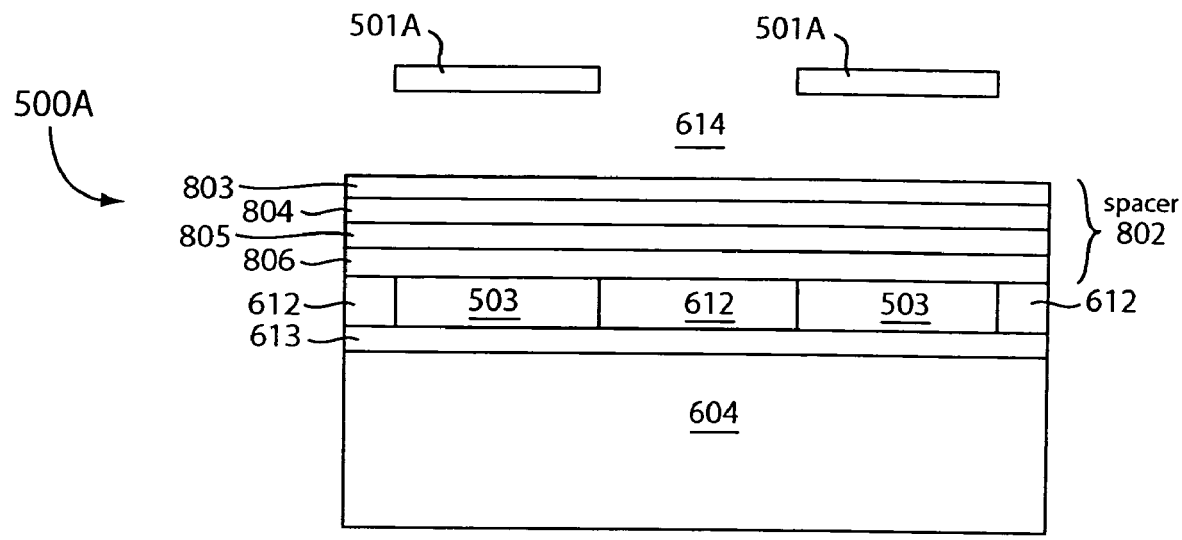
FIG. 8A schematically shows a cross-sectional view of a ribbon-type diffractive spatial light modulator in accordance with an embodiment of the present invention.

FIG. 8A schematically shows a cross-sectional view of a ribbon-type diffractive spatial light modulator 500A in accordance with an embodiment of the present invention. Light modulator 500A is the same as the light modulator 500 of FIG. 5A except for the use of a dielectric spacer stack 802 instead of a dielectric spacer 502. In the example of FIG. 8A, the dielectric spacer stack 802 serves as a dielectric mirror and comprises a stack of dielectric materials comprising a silicon dioxide layer 803, a silicon nitride layer 804, a silicon dioxide layer 805, and a silicon nitride layer 806. The dielectric spacer stack 802 may be configured to reflect light impinging on it. The light reflection may be tailored by adjusting the thicknesses of the dielectric materials in the dielectric spacer stack 802. This would depend on the application and may be optimized by experimentation.

Figure 8B:
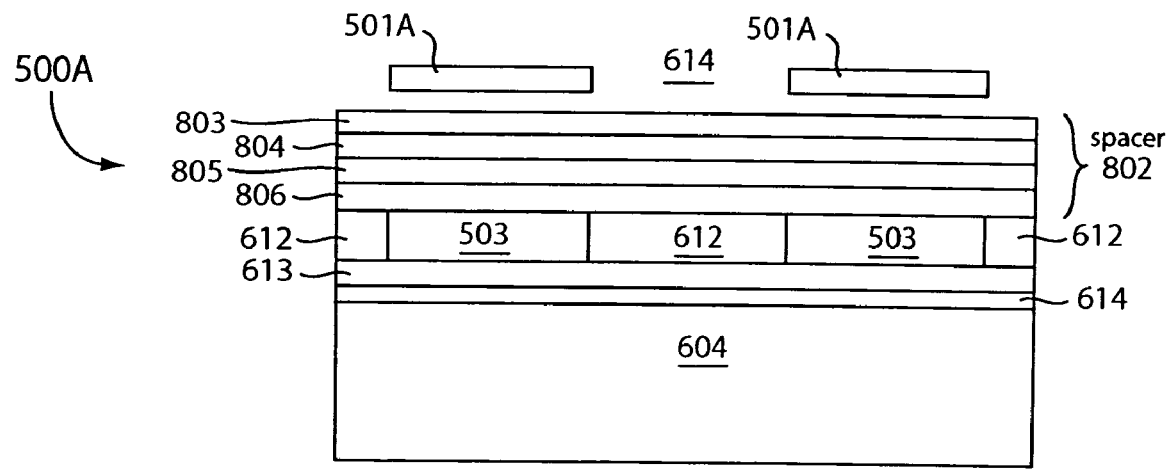
FIG. 8B schematically shows the actuation of the ribbons of the light modulator of FIG. 8A.

In the example of FIG. 8A, the dielectric spacer stack 802 serves as a "stationary bias ribbon." That is, the dielectric spacer stack 802 eliminates the need for stationary bias ribbons. Accordingly, in the example of FIG. 8A, all the movable members are deflectable active ribbons 501A. As shown in FIG. 8B, the deflectable ribbons 501A move towards the dielectric spacer stack 802 upon actuation.

Figure 9A:
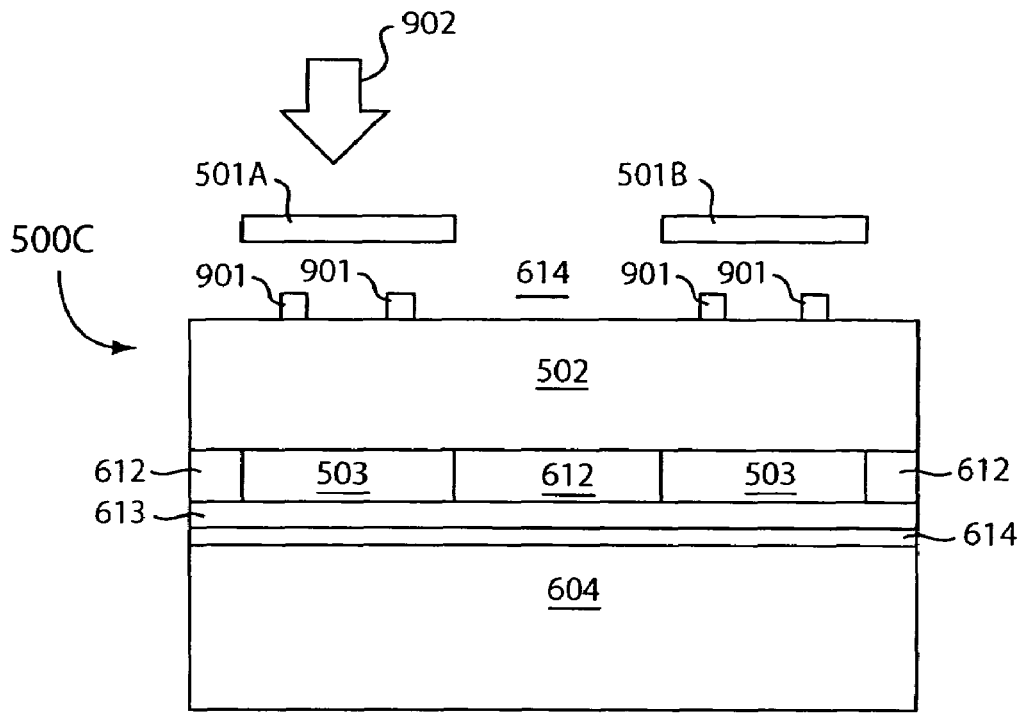
FIG. 9A schematically shows a cross-sectional view of a ribbon-type diffractive spatial light modulator in accordance with an embodiment of the present invention.

In other embodiments, a spacer between the movable members and bottom electrodes may include one or more discrete projections located directly below the movable members. FIG. 9A schematically shows a cross-sectional view of a ribbon-type diffractive spatial light modulator 500C in accordance with an embodiment of the present invention. The light modulator 500C is the same as the light modulator 500 of FIG. 5A except that projections 901 are formed on the top surface of dielectric spacer 502 directly under the ribbons 501. The projections 901 further cut down gap 614, thereby further improving squeeze-film damping. The projections 901 may be formed as part of the dielectric spacer 502 during fabrication. For example, the projections 901 may be patterned on the top surface of the dielectric spacer 502 before the sacrificial layer is formed over the dielectric spacer 502.

Figure 9B:
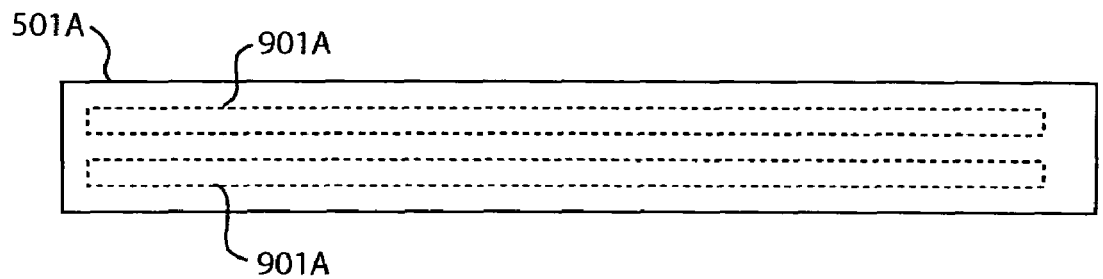
FIGS. 9B and 9C schematically show projections formed on dielectric spacers and underneath movable members of light modulators in accordance with embodiments of the present invention.
Figure 9C:
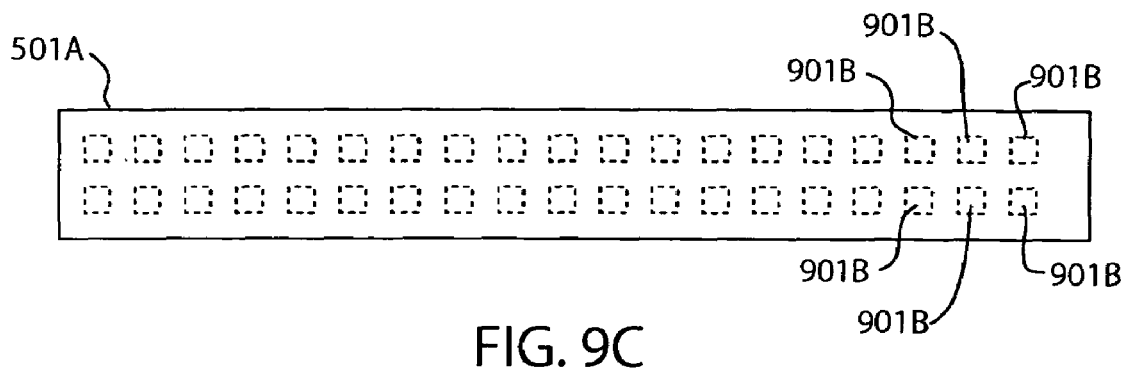

As can be appreciated, the projections 901 may have a variety of shape and sizes. FIGS. 9B and 9C show top views of the ribbon 501A as seen in the direction of arrow 902 of FIG. 9A. In the examples of FIGS. 9B and 9C, projections 901A and 901B are specific embodiments of projections 901. In FIG. 9B, projections 901A comprise ridges that run parallel to the long axis (i.e. length) of the ribbon 501A. Alternatively, a single projection 901A, instead of the two shown in FIG. 9B, may run directly underneath the central portion of the ribbon 501A and parallel to the long axis of the ribbon 501A. In FIG. 9C, projections 901B comprise a plurality of bumps (only some of projections 901B have been labeled for clarity of illustration). The bumps may be arranged a variety of ways under the ribbon 501A. Other shapes, sizes, and arrangements of projections under a ribbon may also be employed without detracting from the merits of the present invention.

MEMS devices with improved squeeze-film damping have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A capacitive micro electro-mechanical systems (MEMS) device comprising:
    a bottom electrode formed over a substrate;
    a movable member serving as a top electrode, the movable member being configured to deflect towards the bottom electrode by electrostatic force to modulate incident light, the movable member comprising a reflective material formed over a resilient material; and
    a dielectric spacer formed over the bottom electrode, the dielectric spacer having a thickness at least half a distance between a bottom surface of the movable member and a top surface of the bottom electrode, the dielectric spacer being separated from the bottom surface of the movable member by a gap;
    wherein the dielectric spacer has a thickness of 2G/3 scaled according to a dielectric constant of the dielectric spacer, where G is the distance between the bottom surface of the movable member and the top surface of the bottom electrode.

2. The device of claim 1 wherein the device comprises a ribbon-type diffractive spatial light modulator.

3. The device of claim 1 wherein the dielectric spacer comprises silicon dioxide.

4. The device of claim 1 wherein the reflective material comprises aluminum and the resilient material comprises silicon nitride.

5. The device of claim 1 wherein the dielectric spacer comprises a stack of dielectric layers.

6. The device of claim 1 wherein the dielectric spacer is configured to serve as a reflective mirror.

7. The device of claim 1 further comprising:

a projection formed on the dielectric spacer and directly underneath the movable member.

8. The device of claim 1 further comprising:

a ridge formed on the dielectric spacer and running parallel with a long axis of the movable member and directly underneath the movable member.

9. The device of claim 1 further comprising:

a plurality of bumps formed on the dielectric spacer and directly underneath the movable member.

* * * * *